P. H. KENNEY.
WRIST PIN FASTENING FOR CROSS HEADS.
APPLICATION FILED MAR. 17, 1917.
1,231,745.
Patented July 3, 1917.
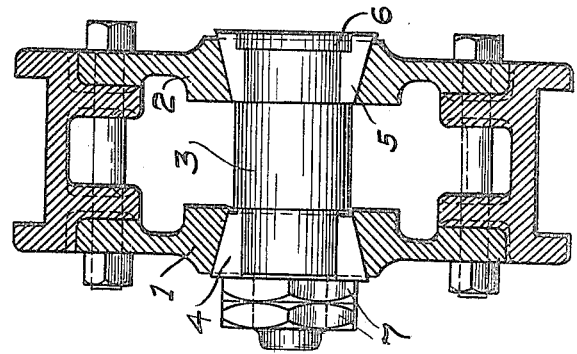
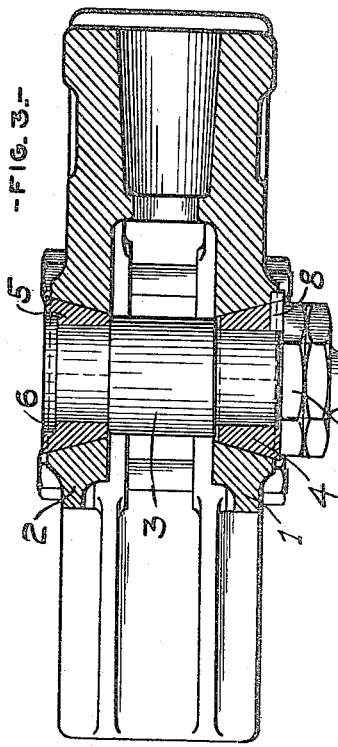
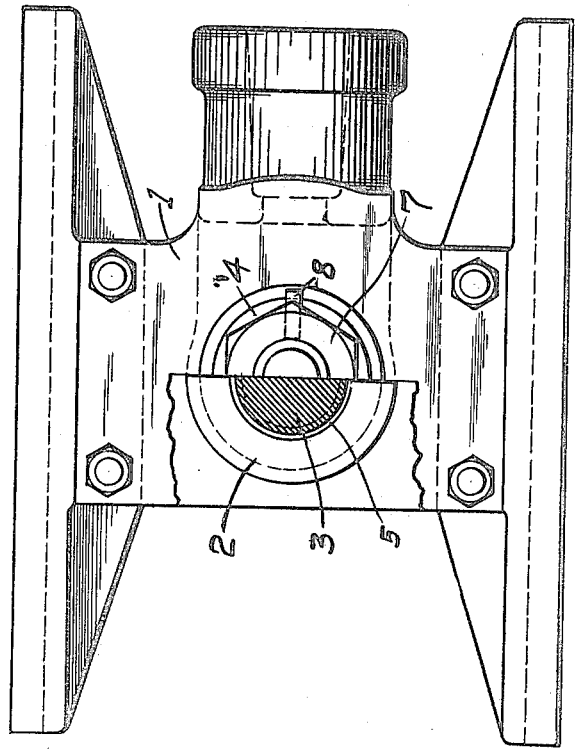
INVENTOR
Patrick H. Kenney.
by Edward A. Wright.
Atty.

UNITED STATES PATENT OFFICE.

PATRICK H. KENNEY, OF KEYSER, WEST VIRGINIA.

WRIST-PIN FASTENING FOR CROSS-HEADS.

1,231,745.      Specification of Letters Patent.      Patented July 3, 1917.

Application filed March 17, 1917. Serial No. 155,386.

*To all whom it may concern:*

Be it known that I, PATRICK H. KENNEY, a citizen of the United States, and a resident of Keyser, in the county of Mineral and State of West Virginia, have invented a certain new and useful Improvement in Wrist-Pin Fastenings for Cross-Heads, of which improvement the following is a specification.

This invention relates to wrist pin fastenings for cross heads, and the like, particularly cross heads for locomotives where the clearance between the back side of the cross head and a driving wheel or other part is sometimes not sufficient to permit the ready removal of the pin by drawing or pushing the same backward out of the openings in the side walls of the cross head. The object of my invention is to provide a bushing connection between the wrist pin and one or more of the walls of the cross head, or other part in which said pin is mounted, whereby upon a slight backward movement of the pin, one or more of the bushings may be detached, leaving an opening of sufficient size to allow the pin to be drawn out on the front side of said cross head, or other moving part. The bushings are preferably formed in sections and tapered to fit corresponding openings in the walls of the cross head, but they may be made in other forms, if desired.

In the accompanying drawing: Figure 1 is a side elevation, partly in section, of a locomotive cross head embodying my improvement; Fig. 2, a vertical section; and Fig. 3, a horizontal section of the same.

According to the construction shown, I have illustrated my improvement as applied to a locomotive cross head, having front and rear walls, 1 and 2, provided with openings for the wrist pin, 3. The openings are preferably tapered toward the center of the cross head, and contain correspondingly shaped bushings, 4 and 5, which may be formed in sections, and in which the inner and outer portions of the pin, 3, are mounted.

The inner end or head, 6, of the pin is preferably formed with a shoulder fitting a corresponding recess in the face of the bushing, 5. The middle portion of the pin, 3, which forms the bearing for the connecting rod, is preferably of slightly larger diameter than the portions bearing in the bushings, and the outer end is threaded for receiving one or more clamping nuts, 7.

In order to prevent the bushings from rotating in the walls, a slot may be formed in the bushing, and also in the wall and in the pin, for containing a key or locking piece, 8.

When the rear wall, 2, is in such close proximity to a driving wheel or some other part as to preclude the possibility of withdrawing the pin from the back side, the pin may be readily taken out by loosening the nuts sufficiently to allow the pin to be pushed inward a short distance, such as about one inch, at which point the detachable bushing, 5, may be readily taken out, thus leaving a large opening for withdrawing the pin from the front side. The pin is inserted in a similar manner, it being pushed inward to a point at which the sectional bushing, 5, may be assembled around the head, 6, and then slipped into place in the opening in the rear wall, 2, the bushing, 4, in wall, 1, also being slipped into place, and the nuts tightened to clamp the parts in position.

While I prefer to make both bushings sectional and detachable, it will be apparent that my improvement may be constructed with but one detachable bushing in the rear wall, 2, and I do not, therefore, limit myself to the particular construction shown.

Having now described my invention, what I claim as new and desire to secure by Letters Patent is:

1. In a wrist pin fastening, the combination of front and rear walls having openings, a detachable bushing mounted in the opening in the rear wall, and a wrist pin mounted in said bushing and extending through the front wall.

2. In a wrist pin fastening, the combination of front and rear walls having openings, sectional bushings mounted in said openings, and a wrist pin extending through said bushings.

3. In a wrist pin fastening, the combination of front and rear walls having openings, a detachable bushing mounted in the opening in the rear wall, and a wrist pin having a head mounted in said bushing and extending through the front wall.

4. In a wrist pin fastening, the combination of front and rear walls having openings, sectional bushings mounted in said openings, and a wrist pin having a head mounted in the rear bushing and extending through the other bushing.

5. In a wrist pin fastening, the combination of front and rear walls having openings, tapered sectional bushings mounted therein, and a wrist pin extending through said bushing.

6. In a wrist pin fastening, the combination of front and rear walls having openings, sectional bushings mounted in said openings, a wrist pin having a head mounted in the rear bushing and extending through the front bushing, and a clamping nut on the outer end of said pin.

7. In a wrist pin fastening, the combination of front and rear walls having openings, tapered sectional bushings mounted therein, and a wrist pin extending through said bushings and having a head at one end and a clamping nut at the other end.

8. In a wrist pin fastening, the combination of front and rear walls having openings, sectional bushings mounted in said openings, a wrist pin extending through said bushings, and a key for preventing the bushing from turning.

In testimony whereof I have hereunto set my hand.

PATRICK H. KENNEY.

Copies of this patent may be obtained for five cents each, by addressing the "Commissioner of Patents, Washington, D. C."